United States Patent Office 3,051,746
Patented Aug. 28, 1962

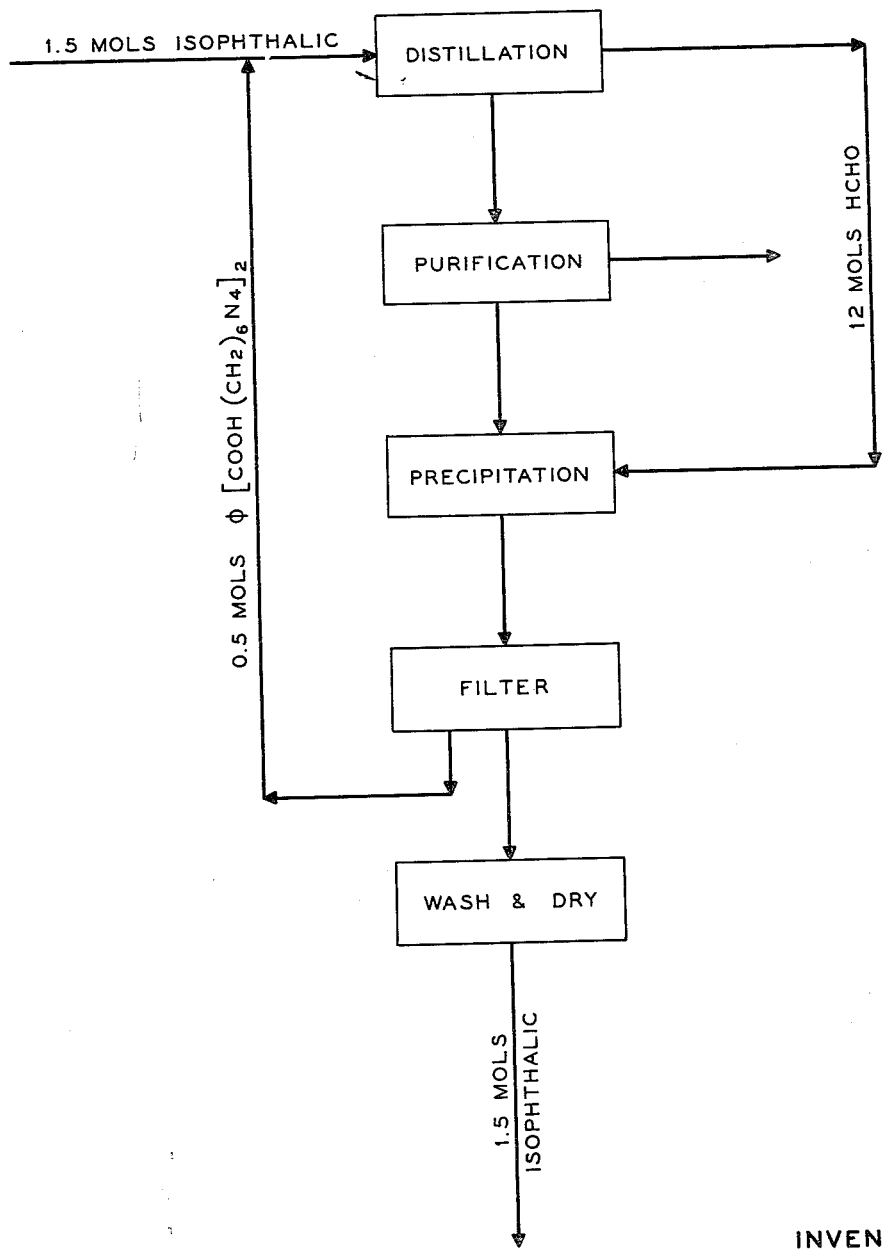

3,051,746
AROMATIC CARBOXYLIC ACID PURIFICATION
William G. Toland, Jr., San Rafael, Calif., assignor to California Research Corporation, San Francisco, Calif., a corporation of Delaware
Filed Apr. 18, 1958, Ser. No. 731,567
4 Claims. (Cl. 260—525)

This invention relates to a process for purifying organic carboxylic acids. More particularly, it relates to a process for removing minor proportions of color bodies and nonacidic organic impurities from organic carboxylic acids in order to produce a finished product which meets commercial specifications.

The process of this invention is of particular utility for the purification of organic carboxylic acids produced by the oxidation of aromatic hydrocarbons with a sulfur oxidant and water. The crude acids of such processes normally contain substantial quantities of free sulfur and sulfo carbons (reaction by-products insoluble in both alkali and hydrocarbon solvents). The process of the present invention is of particular utility in removing these sulfur impurities from the crude acids.

Pursuant to the invention, the impure organic acid, the hexamethylenetetramine salt of the organic acid and water are heated in a distillation zone. An overhead fraction comprising aqueous formaldehyde and a bottoms fraction comprising an aqueous solution of the ammonium salt of the organic acid are withdrawn from the distillation zone. The bottoms fraction may be then treated with a solid adsorbent, such as activated charcoal, silica, alumina, or silica-alumina, or with a water-immiscible solvent, such as petroleum ether or carbon tetrachloride, to remove color bodies and/or organic nonacidic impurities from the bottoms fraction. In many cases, however, the use of solid adsorbents is not necessary since the nonacidic impurities can be merely filtered from the aqueous solution of the ammonium salt of the organic acid. The purified bottoms fraction is then mixed with the aqueous formaldehyde overhead fraction previously withdrawn from the distillation zone to form a mixture of the free organic acid, the hexamethylenetetramine salt of the acid and water. The free organic acid is then removed from this mixture and the residue comprising water and the hexamethylenetetramine salt of the acid is returned to the distillation zone with further quantities of the impure organic acid.

The success of the process of the invention involves controlling the following reversible reaction:

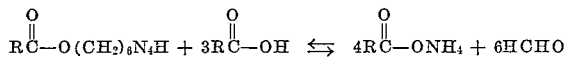

In the distillation zone, which is maintained at relatively high temperature and from which vapors are withdrawn, the reaction proceeds from left to right. The impure organic acid is converted to the ammonium salt, and the bottoms fraction removed from the distillation zone is an aqueous solution of the ammonium salt of the organic acid containing suspended or dissolved impurities. This aqueous solution is readily treated for the removal of color bodies by mixing it with activated charcoal, silica-gel, or other suitable solid adsorbent material and then filtering the resultant mixture to give a clear solution of the ammonium salt of the organic acid. Also, the aqueous solution of the ammonium salt of the organic acid may be extracted with a suitable solvent to remove nonacidic impurities which are contained in the acid.

The aqueous formaldehyde overhead fraction which is removed from the distillation zone is recombined with the purified aqueous solution of the ammoniunm salt of the organic acid in a precipitation zone where a part of the total available acid is liberated as the free organic acid and the remainder is in solution as the hexamethylenetetramine salt of the acid.

The appended drawing illustrates a process flow suitable for the practice of the invention. Impure isophthalic acid produced, for example, by the process described in U.S. Patent No. 2,610,980, followed by the hydrolysis of the amide product, is charged to the distillation zone. The hexamethylenetetramine salt of isophthalic acid is recycled from the filter zone to the distillation zone, the mol ratio of the amine salt to the impure isophthalic acid charged to the distillation zone desirably being 1:3. The mixture in the distillation zone is heated to refluxing temperature, at atmospheric or superatmospheric pressure, and may be refluxed for several minutes to one hour prior to removing aqueous formaldehyde as an overhead fraction. The bottoms fraction from the distillation zone is an aqueous solution of ammonium isophthalate containing color bodies and other impurities present in the isophthalic acid feed. This bottoms fraction is passed into a purification zone where it is intimately mixed with activated charcoal and filtered to remove the activated charcoal as a filter cake and to separate a water-clear ammonium isophthalate solution. The filtrate is passed into the precipitation zone where it is intimately mixed with the aqueous formaldehyde overhead removed from the distillation zone to cause precipitation of isophthalic acid. The resultant isophthalic acid slurry is passed into a filtration zone and filtered to remove pure isophthalic acid as a filter cake and to separate an aqueous solution of the hexamethylenetetramine salt of isophthalic acid as the filtrate. The filtrate is returned to the distillation zone together with further quantities of impure isophthalic acid. The isophthalic acid filter cake is slurried with water or xylene, refiltered, and dried.

The process of the invention is illustrated by the following examples.

*Example 1.—Purification of Isophthalic Acid*

10 parts by weight of impure isophthalic acid, 10 parts by weight of hexamethylenetetramine and 195 parts by weight of water were passed into a still and refluxed for 5 minutes. The mixture was then distilled and 95 parts by weight of aqueous formaldehyde were removed overhead. The bottoms fraction from the distillation zone was intimately mixed with .2 part by weight of activated charcoal. The resultant mixture was filtered and isophthalic acid was precipitated from the filtrate by the addition of the aqueous formaldehyde overhead fraction. The mixture was heated to about 180° F. to facilitate precipitation of the isophthalic acid. The resultant slurry was cooled to room temperature, filtered, and the filter cake was washed with water and dried, yielding 4.3 parts by weight of essentially pure isophthalic acid. The purified isophthalic acid had a Hazen color of 60, compared with a Hazen color of 1000 for the impure isophthalic acid feed. Both color determinations were made employing a 20% aqueous solution of a sodium salt of the acid. The acid number of the purified isophthalic acid was 665, as compared to an acid number of 667 for the isophthalic acid feed.

*Example 2.—Purification of Caproic Acid*

A still, to which was attached a one-foot helices packed column, was charged with 47 g. of n-caproic acid of practical grade, 15 g. of hexamethylenetetramine, and 200 cc. of water. The hexamethylenetetramine dissolved in the water, and the caproic acid formed a separate, liquid, organic layer on the surface. The mixture was distilled at atmospheric pressure until a total of 100 cc. had been condensed overhead. This was analyzed and found to contain 5 g. of free formaldehyde. Fresh water (100 cc.) was added to the pot and the mixture cooled to determine at what temperature two phases would appear. Separation began at 122° F. The pot contents were again heated and an additional 100 cc. of condensate collected. When the pot contents were then cooled, there was no separation of phases, even at room temperature. The solution was carbon treated and filtered. The two 100-cc. overhead fractions were then readded to the carbon-treated caproic acid salt solution and the mixture heated to the boiling point for a few minutes, then cooled. There was immediate stratification of two liquid phases, which were separated. Th organic phase consisted of 30.3 g. of purified caproic acid. The aqueous phase was then ready for recharging to the pot with fresh, impure caproic acid.

*Example 3.—Purification of Acetic Acid*

One mol of acetic acid was converted to its ammonium salt with aqueous ammonia to give a total mixture containing 180 g. of water and 77 g. of ammonium acetate. In this form the acetic acid is separable from nonacidic, water-insoluble impurities. To this was added 130 g. of 37% aqueous formalin. The mixture was refluxed for 5 minutes and then cooled to room temperature, then extracted with ethyl ether. After three 100-cc. extractions, the ether was found to contain 0.2 mol of acetic acid. An additional 130 g. of 37% formalin was then added to the solution and the mixture refluxed for 5 minutes and cooled to room temperature. This was extracted with another three 100-cc. portions of ethyl ether, which were found to contain 0.15 mol of acetic acid. A third series of three 100-cc. ether extractions removed an additional 0.12 mol of acetic acid. The total acetic acid extracted in this way amounted to 0.456 mol. Evaporation of the ether left a residue of 44.2 g. of acetic acid.

*Example 4.—Purification of Terephthalic Acid*

The crude terephthalic acid used in this example was obtained by the oxidation of paraxylene with sulfur and water. The crude acid contained 76.1% terephthalic acid, 20.1% free sulfur, and 3.8% of sulfo carbons (reaction by-products insoluble in both alkali and hydrocarbon solvents). 21.8 g. of this crude acid (containing 16.6 g.=0.1 mol terephthalic acid) was mixed with 7.1 g. of hexamethylenetetramine (equivalent to 0.2 mol ammonia) in 500 ml. of water. The reagents were placed in a flask equipped with a steam inlet for steam stripping and a condenser. The reaction mixture was steam-stripped until only traces of formaldehyde were evident in the vapors. The products remaining in the flask were filtered to give a filter cake weighing 6.9 g. (the theoretical weight of impurities being 5.2 g.). The filtrate was treated with 35 ml. of aqueous 37% formaldehyde at 80° C. and was then chilled and filtered. The final filter cake was washed and dried and weighed 10.5 g. The purified acid had an acid number of 667.5, corresponding to a product purity of about 99%. The weight of the recovered product represents a yield of terephthalic acid of 84% of theory, based on the expectation that a quarter of the purified acid in the filtrate will remain in solution as the hexamethylenetetramine salt of the acid. The final product yield can be increased by similar repeated treatment of the sulfur-containing filter cake to recover an additional 1.7 g. of terephthalic acid.

The process described above is fully operable for the purification of any organic carboxylic acid which is free of functional substituents which are reactive with formaldehyde, i.e., having only functional groups that are inert to formaldehyde. In general, it is desirable to charge organic carboxylic acids, free of functional groups other than the carboxyl group, to the purification process. While the process of the invention is applicable to the purification of any organic carboxylic acid which is free of functional groups which are reactive with formaldehyde, commercial application of the process is most attractive with those acids whose ammonium salts are substantially more water-soluble than the acids themselves.

Acids which are themselves sparingly soluble in water and whose ammonium salts are moderately to very soluble in water are considered optimum charging stocks for the process of the invention. For example, aliphatic monocarboxylic acids containing 4 to 14 carbon atoms per molecule, aliphatic dicarboxylic acids containing 6 to 16 carbon atoms per molecule, and aromatic carboxylic acids such as benzoic acids, toluic acids, phthalic acids, benzene carboxylic acids containing 3 or more carboxyl groups per molecule, and naphthenic acids are suitable feeds to large-scale purification units employing the process of the invention.

Normally solid acids of the above character are especially well adapted to purification pursuant to the invention. It is desirable that the ammonium salt of the acid to be purified have a moderate to high solubility in water in order to maintain the volume of solution which must be handled in the distillation zone at reasonably low levels. For example, if it is attempted to purify stearic acid pursuant to the process of the invention, a very large volume of water must be present in the distillation zone to dissolve the ammonium stearate produced there. Similarly, it is desirable that the acid itself have a reasonably low solubility in water to permit separation of a distinct acid phase in the precipitation zone. Highly water-soluble acids such as acetic acid may be purified pursuant to the invention, but a separate phase of acetic acid cannot be produced in the precipitation zone and, instead, the addition of formaldehyde to the filtrate in the precipitation zone results in a homogeneous mixture of water, acetic acid and hexamethylenetetramine salt of acetic acid. This mixture and other mixtures of similar character may be subjected to extraction, for example, with diethyl ether to remove the free organic acid from the homogeneous mixture formed in the precipitation zone. In handling such mixtures, an extraction step is substituted for the filtration step shown in the flow sheet. While separation in this manner is fully operable, it is less attractive than separation by filtration, since it requires the employment of an additional liquid in the process flow, which liquid must subsequently be recovered and recycled.

The process of the invention may also be used to purify oxidation products from paraffins, to separate acids from esters, aldehydes, ketones, alcohols, ethers, etc. simultaneously produced. It may also be employed to separate adipic acid from cyclohexanone oxidation products or toluic acids from xylene oxidation products.

The proportions of reactants charged to the distillation zone should be such that the charge contains at least 1 mol of hexamethylenetetramine to each 4 mols of carboxyl radical. Pursuant to the flow sheet, 1 mol of hexamethylenetetramine carboxylate should be charged to the distillation zone with each 3 mols of free carboxyl radical charged to the zone. If lesser amounts of potentially available hexamethylenetetramine are charged to the distillation zone, it is impossible to convert all of the carboxyl radicals in the distillation zone to ammonium carboxylates. If a relatively water-insoluble acid is charged to the distillation zone, the employment of less than the indicated amount of available hexamethylenetetramine may make it impossible to take all of the acid into solution. Larger amounts of available hexamethylenetetramine may be charged to the distillation zone, for example, as much as 2 to 3 mols of hexamethylenetetramine salt of the acid per mol of acid may be charged to the distillation zone. Larger amounts of the hexamethylenetetramine salt of the acid may be employed without loss of operability, but no advantage is attained by the employment of larger amounts.

The quantity of water charged to the distillation zone ordinarily must be somewhat in excess of the amount required to dissolve all of the ammonium carboxylate formed there; clearly if it is not, some purification will be obtained, but it will not be the optimum amount. The excess is ordinarily necessary since some of the water charged to the distillation zone is removed overhead with the formaldehyde. In purifying the preferred charging stocks which are acids of limited water-solubility, the total water charged to the distillation zone is desirably a quantity insufficient to dissolve all of the impure acid charged to the zone in order to permit separation of a distinct acid phase in the precipitation zone.

The distillation zone is operated at a temperature at least equal to the boiling temperature of the mixture charged to the zone and below about 350° F. Superatmospheric pressures up to about 100 p.s.i. are useful as a means of obtaining a more concentrated formaldehyde distillate than at atmospheric or subatmospheric pressures. The employment of unnecessarily high temperatures, i.e., above 350° F., tends to promote undesired side reactions involving the formaldehyde and ammonia.

In the distillation zone, the impure acid being subjected to treatment is taken into solution, forming an aqueous solution of the ammonium salt of the acid. In this form the acid is readily subjected to various purification treatments. This solution is readily contacted with adsorptive solid material, such as activated charcoal, silica-gel, alumina, and the like, to remove color bodies and is readily extracted with water-immiscible solvents to remove non-acidic impurities which are either insoluble or relatively insoluble in water. The aqueous ammonium salt solution in the purification zone may be either treated with a solid adsorbent or subjected to extraction with a water-immiscible solvent such as petroleum ether or with higher boiling substantially saturated petroleum distillates, or both. The temperature employed in the purification treatment is ordinarily in the range from ambient temperature to the boiling point of the liquid charged to the purification zone.

The precipitation zone is ordinarily maintained at a temperature ranging from ambient temperature to the boiling point of the liquid charged to the precipitation zone. Somewhat elevated temperatures in the range 150° F. to 200° F. may be desirably employed since they increase the rapidity of the precipitation. The effluent from the precipitation zone is desirably cooled prior to filtration.

Those skilled in the art will recognize that the process above described can be varied considerably without departure from the basic purification concept involved therein.

This application is a continuation-in-part of my copending application Serial No. 476,020, now abandoned, filed December 17, 1954, for "Organic Acid Purification."

I claim:

1. A process for removing sulfur and non-acidic sulfocarbon impurities from a carboxylic acid containing such impurities and selected from the group consisting of benzoic acid, toluic acids, phthalic acids, and naphthenic acids, which comprises heating a mixture of (1) the impure acid, (2) at least 1 mol of hexamethylenetetramine salt of the acid per 4 mols of carboxyl radical in said acid, and (3) at least sufficient water to dissolve all of the ammonium carboxylate formed but insufficient to dissolve all the carboxylic acid present, in a distillation zone, separating an overhead fraction comprising aqueous formaldehyde and a bottoms fraction comprising an aqueous solution of ammonium salts of the acid in the distillation zone at a temperature not in excess of about 350° F., mixing the bottoms fraction with a solid adsorbent and filtering the mixture, mixing the filtrate and the aqueous formaldehyde overhead from the distillation zone to form a mixture of free acid, the hexamethylenetetramine salt of the acid and water, separating the free organic acid from the mixture and returning the residue to the distillation zone together with further quantities of impure organic acid.

2. A claim according to claim 1 wherein the acid is terephthalic acid.

3. A claim according to claim 1 wherein said acid is isophthalic acid.

4. A process for removing sulfur and non-acidic sulfocarbon impurities from a carboxylic acid containing such impurities and selected from the group consisting of benzoic acid, toluic acids, phthalic acids, and naphthenic acids, which comprises heating a mixture of (1) the impure acid, (2) at least 1 mol of hexamethylenetetramine salt of the acid per 4 mols of carboxyl radical in said acid, and (3) at least sufficient water to dissolve all of the ammonium carboxylate formed but insufficient to dissolve all the carboxylic acid present, in a distillation zone, separating an overhead fraction comprising aqueous formaldehyde and a bottoms fraction comprising an aqueous solution of ammonium salts of the acid in the distillation zone at a temperature not in excess of about 350° F., separating insoluble materials from the bottoms fraction, mixing the liquid portion of the bottoms fraction with aqueous formaldehyde to form a mixture of free organic acid with hexamethylenetetramine salt of the acid and water, separating the free organic acid from the mixture and returning the residue to the distillation zone together with further quantities of impure organic acid.

References Cited in the file of this patent
UNITED STATES PATENTS

| | | |
|---|---|---|
| 1,336,709 | Tschunke | Apr. 13, 1920 |
| 1,900,649 | Jaeger | Mar. 7, 1933 |
| 2,697,723 | Carlston et al. | Dec. 21, 1954 |
| 2,745,872 | Carlston et al. | May 15, 1956 |

OTHER REFERENCES

Rodd: Chemistry of Carbon Compounds, vol. I, part A, page 494 (1951). (Copy in Library.)